(12) United States Patent
Bichkar et al.

(10) Patent No.: US 12,168,435 B2
(45) Date of Patent: Dec. 17, 2024

(54) CONTROL SYSTEM FOR AN ENGINE DISCONNECT CLUTCH IN A HYBRID VEHICLE

(71) Applicant: FORD GLOBAL TECHNOLOGIES, LLC, Dearborn, MI (US)

(72) Inventors: Akshay Bichkar, Ann Arbor, MI (US); Corey James Blue, Belleville, MI (US); Samuel Melville Glauber, McLean, VA (US); Jason Meyer, Canton, MI (US); Bradley Dean Riedle, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 216 days.

(21) Appl. No.: 17/989,381

(22) Filed: Nov. 17, 2022

(65) Prior Publication Data
US 2024/0166191 A1    May 23, 2024

(51) Int. Cl.
*B60W 20/40* (2016.01)
*B60W 10/02* (2006.01)
*B60W 10/06* (2006.01)
*B60W 10/08* (2006.01)

(52) U.S. Cl.
CPC ............ *B60W 20/40* (2013.01); *B60W 10/02* (2013.01); *B60W 10/06* (2013.01); *B60W 10/08* (2013.01); *B60W 2510/0208* (2013.01); *B60W 2510/083* (2013.01)

(58) Field of Classification Search
CPC .................................................... B60W 20/40
See application file for complete search history.

(56) References Cited

U.S. PATENT DOCUMENTS

| | | |
|---|---|---|
| 8,308,608 B2 | 11/2012 | Wilke et al. |
| 9,156,468 B2 | 10/2015 | Ideshio et al. |
| 9,321,457 B2 | 4/2016 | Gibson et al. |
| 9,527,505 B1 | 12/2016 | Gibson et al. |
| 9,933,069 B2 | 4/2018 | Yanakiev et al. |
| 10,377,369 B2 | 8/2019 | Meyer et al. |

(Continued)

FOREIGN PATENT DOCUMENTS

| | | |
|---|---|---|
| JP | 2003205768 A | 7/2003 |
| JP | 2018040430 A | 3/2018 |

*Primary Examiner* — Aryan E Weisenfeld
(74) *Attorney, Agent, or Firm* — Vincent Mastrogiacomo; Brooks Kushman P.C.

(57) ABSTRACT

A vehicle includes an engine, an electric machine, a disconnect clutch, and a controller. The engine and the electric machine are each configured to generate power. The disconnect clutch is disposed between the engine and the electric machine. The controller is programmed to, in response to a command to start the engine, close the disconnect clutch to transfer power from the electric machine to the engine. The controller is further programmed to control the torque of the disconnect clutch via increasing a pressure applied to the disconnect clutch based on a first-order model of the pressure applied to the disconnect clutch. The controller is further programmed to adjust the model based on a difference between an expected pressure to the disconnect clutch and a measured pressure of the disconnect clutch during a time period prior to transferring torque through the disconnect clutch.

20 Claims, 3 Drawing Sheets

(56) References Cited

U.S. PATENT DOCUMENTS

| | | |
|---|---|---|
| 10,661,784 B2 * | 5/2020 | Ford .................... B60W 10/184 |
| 2007/0102205 A1 | 5/2007 | Yamanaka et al. |
| 2007/0278022 A1 | 12/2007 | Tanishima |
| 2008/0236539 A1 | 10/2008 | Zheng et al. |
| 2015/0329105 A1 | 11/2015 | Matsui et al. |
| 2016/0069402 A1 | 3/2016 | Chimner |
| 2022/0213856 A1 | 7/2022 | Baxendale et al. |
| 2022/0379874 A1 | 12/2022 | Xu et al. |

* cited by examiner

CONTROL SYSTEM FOR AN ENGINE DISCONNECT CLUTCH IN A HYBRID VEHICLE

TECHNICAL FIELD

The present disclosure relates to control systems for hybrid vehicle powertrains.

BACKGROUND

Hybrid vehicle powertrains may include several power generating devices such as internal combustion engines and electric motors.

SUMMARY

A vehicle includes a powertrain, a disconnect clutch, and a controller. The powertrain has an engine and an electric machine that are each configured to generate power to propel the vehicle. The disconnect clutch is disposed between the engine and the electric machine. The disconnect clutch is configured to open to disconnect the engine from a remainder of the powertrain and is configured to closed to connect the engine to the remainder of the powertrain. The controller is programmed to, in response to a command to start the engine, close the disconnect clutch to transfer power from electric machine to the engine to start the engine. The controller is further programmed to control the torque of the disconnect clutch during the engine start via increasing a hydraulic pressure applied to the disconnect clutch. The hydraulic pressure applied to the disconnect clutch is based on a model that compensates for a delay between a torque command to the disconnect clutch and a measured torque of the disconnect clutch. The controller is further programmed to adjust the model based on a difference between an expected hydraulic pressure of the disconnect clutch and a measured hydraulic pressure of the disconnect clutch during the engine start.

A vehicle includes an engine, an electric machine, a clutch, and a controller. The engine and the electric machine are each configured to generate power to propel the vehicle. The clutch is disposed between the engine and the electric machine. The controller is programmed to, in response to an engine start, close the clutch to transfer power from the electric machine to the engine during the engine start. The controller is further programmed to control the torque of the clutch during the engine start via increasing a hydraulic pressure applied to the clutch based on a model that compensates for a delay between a command to increase a torque of the clutch and an actual torque of the clutch. The controller is further programmed to adjust the model based on a difference between an expected hydraulic pressure of the clutch and a measured hydraulic pressure of the clutch during the engine start.

A vehicle includes an engine, an electric machine, a disconnect clutch, and a controller. The engine and the electric machine are each configured to generate power. The disconnect clutch is disposed between the engine and the electric machine. The controller is programmed to, in response to a command to start the engine, close the disconnect clutch to transfer power from the electric machine to the engine. The controller is further programmed to control the torque of the disconnect clutch via increasing a pressure applied to the disconnect clutch based on a first-order model of the pressure applied to the disconnect clutch. The controller is further programmed to adjust the model based on a difference between an expected pressure of the disconnect clutch and a measured pressure of the disconnect clutch during a time period prior to transferring torque through the disconnect clutch.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
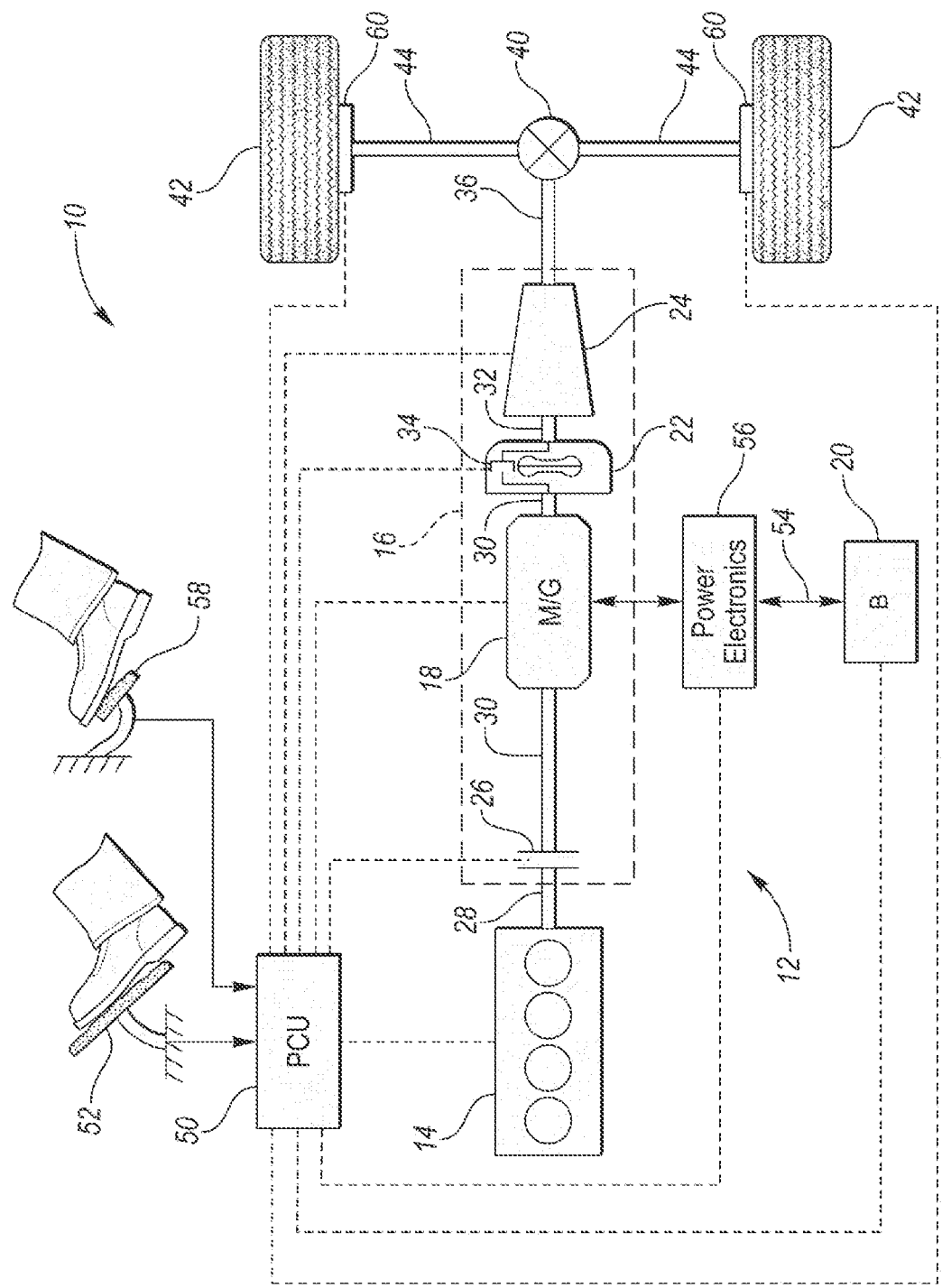
FIG. 1 is a schematic illustration of an exemplary powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 and the M/G 18 may each be referred to as powerplants that are configured to generate power to propel the vehicle 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially closed or engaged, power flow from the engine 14 to the M/G 18 or from the M/G 18 to the engine 14 is possible. For example, the disconnect clutch 26 may be closed or engaged and M/G 18 may operate as a generator to convert rotational energy provided by a crankshaft 28 and M/G shaft 30 into electrical energy to be stored in the battery 20. The disconnect clutch 26 can also be opened or disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The wheels 42 may be referred to as drive wheels that are driven by the powerplants (e.g., engine 14 and M/G 18) of the vehicle 10 via power that is transferred from the powerplants, through the subcomponents of the powertrain (e.g., torque converter 22, gearbox 24, shaft 36, differential 40, half shafts 44, etc.) to the drive wheels 42.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component amount or presence, intake air flow (MAF), transmission gear, ratio, or mode, transmission oil temperature (TOT), transmission turbine speed (TS), torque converter bypass clutch 34 status (TCC), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

Figure 2:
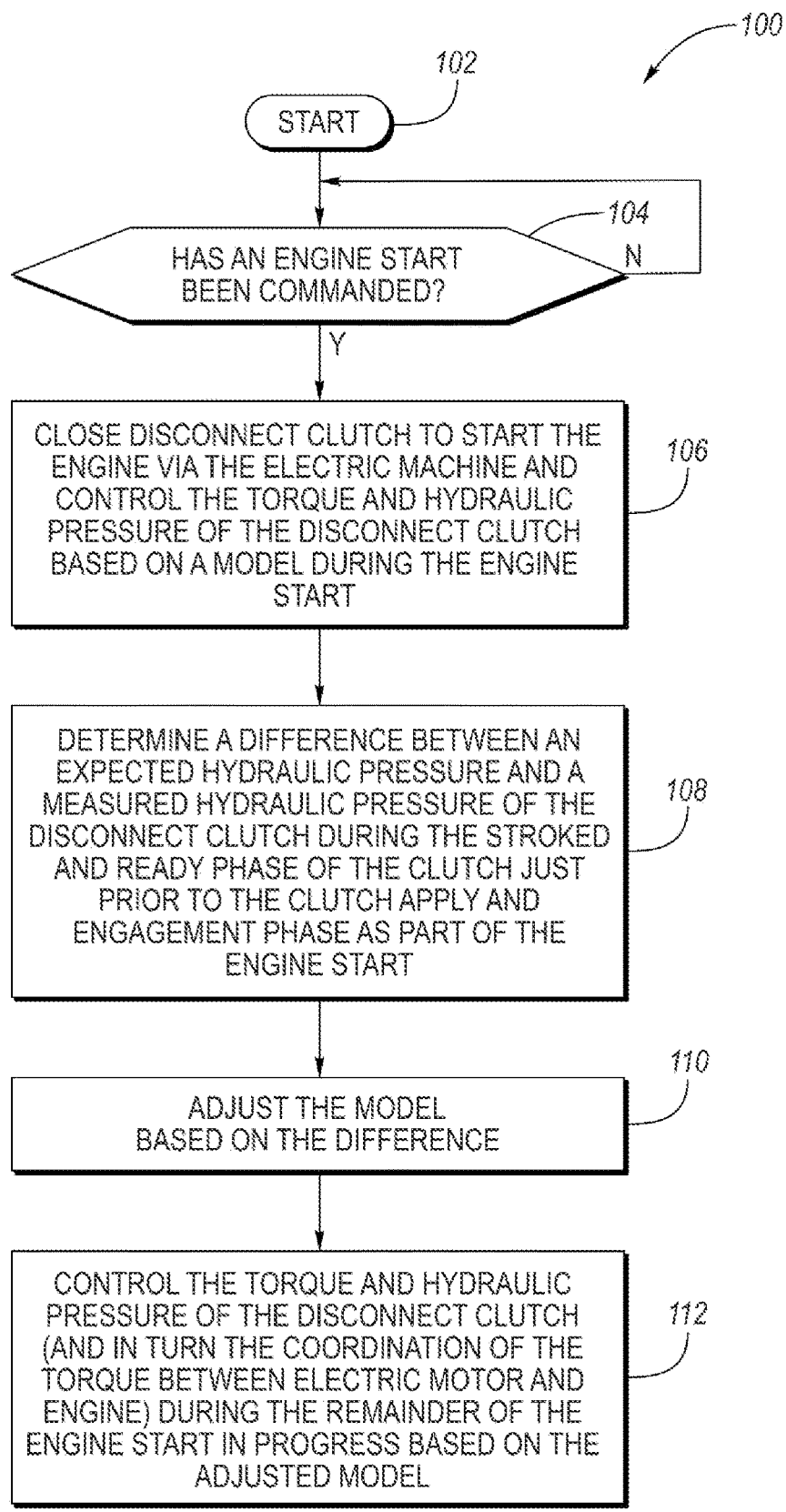
FIG. 2 is a flow chart illustrating a method for controlling an engine disconnect clutch during an engine start.
Figure 3:
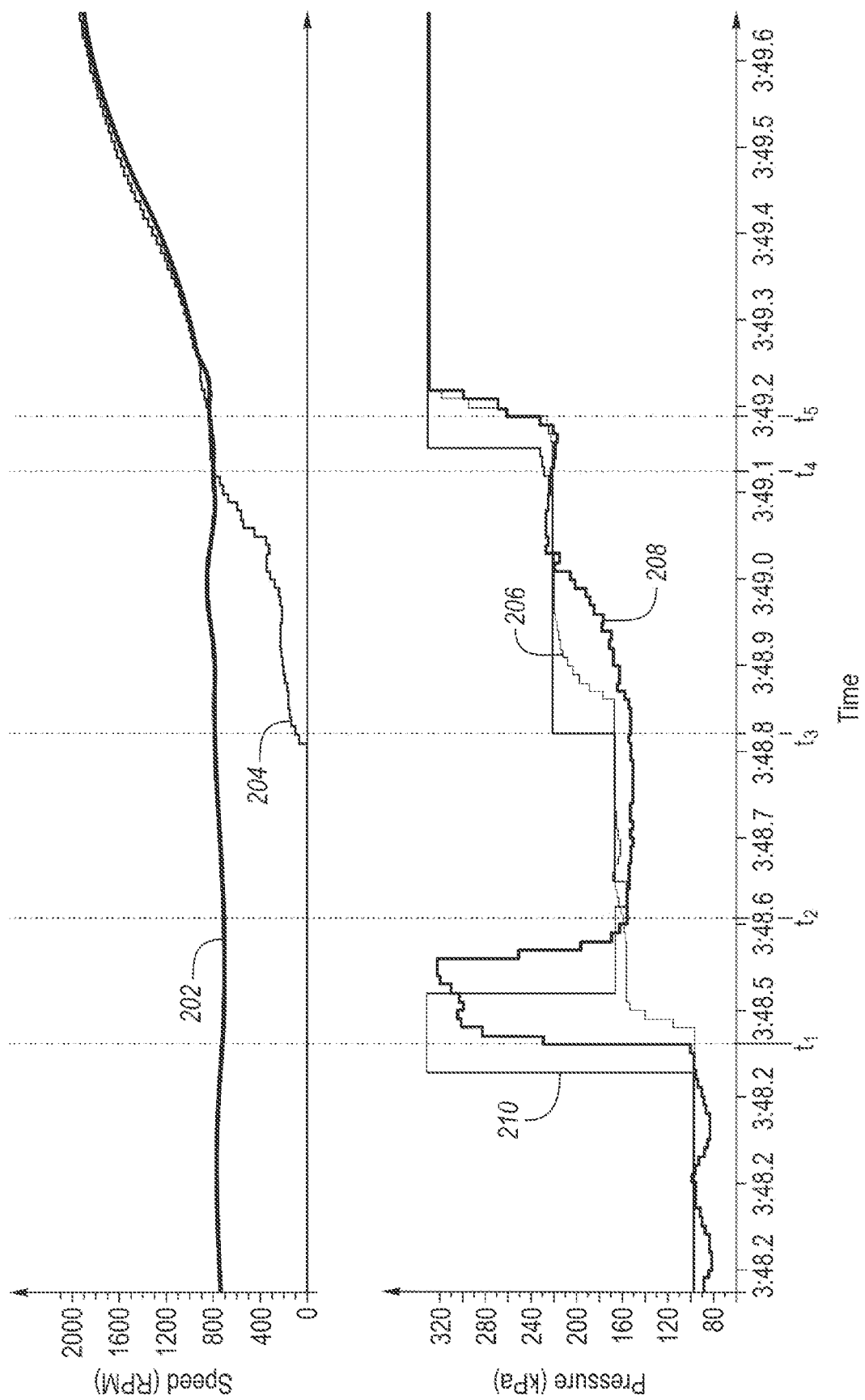
FIG. 3 is a series of graphs illustrating the hydraulic pressure of the engine disconnect clutch during the engine start.

Referring to FIGS. 2 and 3, (i) a flowchart illustrating a method for controlling the engine disconnect clutch 26 during a start of the engine 14 and (ii) a series of graphs illustrating the hydraulic pressure of the disconnect clutch 26 during the start of the engine 14 are illustrated, respectively. The method 100 and graphs illustrated in FIGS. 2 and 3 may be stored as control logic and/or an algorithm within the controller 50. The controller 50 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle 10.

The method 100 next moves on to block 104 where it is determined if an engine start has been commanded (i.e., has a command been received to start the engine 14). If an engine start has not been commanded, the method 100 recycles back to the beginning of block 104. If an engine start has been commanded, the method 100 moves on to block 106. At block 106, the disconnect clutch 26 is progressively closed to start the engine 14 via the electric machine 18. More specifically, the disconnect clutch 26 is progressively closed to transfer power from electric machine 18 to the engine 14 to start the engine 14. Also at block 106, the torque and hydraulic pressure of the disconnect clutch 26 are controlled during the engine start. More specifically, the torque of the disconnect clutch 26 is controlled during the engine start via increasing a hydraulic pressure applied to the disconnect clutch 26. The hydraulic pressure applied to the disconnect clutch 26 and the torque of the disconnect clutch 26 during the start can be approximated using various different systems or models. For simplicity and ease of use, in this example, the relationship is based on first-order with pure delay systems or models. The first-order with delay systems or models may also map the relationship between the hydraulic pressure applied to the disconnect clutch 26 and the torque of the disconnect clutch 26. The first-order with delay systems or models may compensate for a delay between a torque command to the disconnect clutch 26 and a measured torque of the disconnect clutch 26 during the engine start. The first-order with delay systems or models may further compensate for a delay between a torque commanded to the electric machine 18 and a measured torque of the electric machine 18 during the engine start. Such systems or models of the hydraulic pressure applied to the disconnect clutch 26 and the torque of the disconnect clutch 26 are described in U.S. patent application Ser. No. 17/330,315 filed on May 25, 2021, the disclosure of which is hereby incorporated in its entirety by reference herein. It should be understood that the first-order with delay system or model is but one example of a model. Any other model that approximates the dynamic relationship between clutch apply pressure and clutch capacity that accounts for hydraulics and actuation delays is acceptable for use with embodiments of the present disclosure.

A first-order model or control system may be defined as a type of control system whose input-output relationship or transfer function is a first-order differential equation. A first-order differential equation contains a first-order derivative, but no derivative higher than the first order. The order of a differential equation is the order of the highest order derivative present in the equation.

Referring to FIG. 3, several parameters of the powertrain are illustrated during an engine start. The speed of the electric machine is illustrated by line 202, the speed of the engine is illustrated by line 204, a model (expectation) or estimate of the hydraulic pressure of the disconnect clutch 26 based on the above mentioned first-order with delay system or model is illustrated by line 206, and a measured or actual pressure of the disconnect clutch 26 is illustrated by line 208. The estimate of the hydraulic pressure of the disconnect clutch 206 is generated in response to a commanded pressure to the disconnect clutch 206, which is illustrated by line 210. At time $t_1$ the hydraulic pressure of the disconnect clutch is boosted until the disconnect clutch 26 is expected to reach the kiss point at time $t_2$. The time period between times $t_1$ and $t_2$ may be referred to as the boost phase of the disconnect clutch 26. The kiss point corresponds to stroking a piston of the disconnect clutch 26 via the hydraulic fluid to an engagement point between opposing sides of the disconnect clutch 26 but prior to transferring torque through the disconnect clutch 26. The disconnect clutch 26 may remain at the kiss point for a period of time between times $t_2$ and $t_3$. The time period between times between times $t_2$ and $t_3$ may be referred to as the stroked and ready phase of the disconnect clutch 26, which is just prior to a clutch apply and engagement phase where torque begins to transfer through the disconnect clutch 26. The clutch apply and engagement phase occurs after time $t_3$.

At time $t_3$, the hydraulic pressure of the disconnect clutch 26 is further increased to increase the capacity of the disconnect clutch 26 to transfer torque so that the power of the electric machine 18 may be transferred through the disconnect clutch 26 in order to start the engine 14. After the speed of the engine 14 and the electric machine 18 are synchronized at time t4, it is determined that the engine start is complete and the hydraulic pressure of the disconnect clutch 26 is further increased after time is so that the capacity of the disconnect clutch 26 to transfer torque is further increased.

Returning to FIG. 2, after block 106, the method 100 moves on to block 108 where a difference between the expected hydraulic pressure 206 of the disconnect clutch 26 and the measured hydraulic pressure 208 of the disconnect clutch 26 during the engine start is determined. The difference between the expected hydraulic pressure 206 of the disconnect clutch 26 and the measured hydraulic pressure 208 of the disconnect clutch 26 may be determined while the disconnect clutch 26 is at the kiss point (e.g., during the time period between $t_2$ and $t_3$ in FIG. 3). Also, the difference between the expected hydraulic pressure 206 of the disconnect clutch 26 and the measured hydraulic pressure 208 of the disconnect clutch 26 may be determined after a boost phase of the disconnect clutch 26 (e.g., after time $t_2$ in FIG. 3) but prior to transferring torque through the disconnect clutch (e.g., right before time $t_3$ in FIG. 3).

The method 100 next moves on to block 110 where the first-order with delay system or model of the hydraulic pressure of the disconnect clutch 26, which illustrated by line 206, is adjusted for the remainder of the current engine start (e.g., the portion of the engine start after time $t_3$) based on the difference between the expected hydraulic pressure 206 of the disconnect clutch 26 and the measured hydraulic pressure 208 of the disconnect clutch 26, which was determined at block 108. The adjustment to the first-order with delay system or model of the hydraulic pressure of the disconnect clutch 26 may be based on a weighted value of the difference between the expected hydraulic pressure 206 and the measured hydraulic pressure 208 right before time $t_3$. For example, the first-order with delay system or model of the hydraulic pressure of the disconnect clutch 26 may be adjusted for the duration of the rest of the engine start in progress based on equation (1):

$$M_{c\_adj} = M_c - W_{fac} * (P_c - P_m) \qquad (1)$$

where $M_{c\_adj}$ is an adjusted model (combination of first-order time constant and pure delay) of the expected hydraulic pressure, $M_c$ is the model (combination of first-order time constant and pure delay) of the expected hydraulic pressure (which creates line 206) prior to being adjusted, $P_c$ is the expected hydraulic pressure 206 right before time $t_3$, $P_m$ is the measured hydraulic pressure 208 at the same point right before time $t_3$, and $W_{fac}$ is the weighting or scaling factor.

Note that the adjustment to the model can be achieved by either adjusting the first-order time constant or the pure delay or a combination of time-constant and delay, and the weighting or scaling factors can be independent for the time-constant and delay adjustments.

It is noted that various models of the expected hydraulic pressures may be stored in lookup tables in the controller 50 based on various operating conditions. Such operating conditions may include scenarios where the boost phase of the disconnect clutch 26 was required, scenarios where the boost phase of the disconnect clutch 26 was not required, the temperature of the hydraulic fluid supplied to the disconnect clutch 26, the supply or feed pressure of the hydraulic fluid as it is being delivered to the disconnect clutch 26. Each adjustment of the first-order system or model of the expected hydraulic pressure of the disconnect clutch 26 may be only directed to the values in the lookup tables that correspond to the specific operating condition where it was determined that an adjustment was necessary.

The method 100 next moves on to block 112 where the torque of the disconnect clutch 26 and the hydraulic pressure applied to the disconnect clutch 26 are controlled during the remainder of the engine start in progress (e.g., the portion of the engine start after time $t_3$) based on the adjusted first-order with delay system or model of the expected hydraulic pressure 206 of the disconnect clutch 26 (i.e., based on the adjustment according to block 110). It is noted that the method 100 may be implemented during each engine start and adjustments to the first-order system or model of the expected hydraulic pressure 206 of the disconnect clutch 26 may be made specific and limited to each engine start. It should be understood that the flowchart in FIG. 2 is for illustrative purposes only and that the method 100 should not be construed as limited to the flowchart in FIG. 2. Some of the steps of the method 100 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
a powertrain having an engine and an electric machine each configured to generate power to propel the vehicle;
a disconnect clutch (i) disposed between the engine and the electric machine, (ii) configured to open to disconnect the engine from a remainder of the powertrain, and (iii) configured to closed to connect the engine to the remainder of the powertrain; and
a controller programmed to, in response to a command to start the engine,
close the disconnect clutch to transfer power from electric machine to the engine to start the engine,
control a torque of the disconnect clutch during the engine start via increasing a hydraulic pressure applied to the disconnect clutch, wherein the hydraulic pressure applied to the disconnect clutch is based on a model that compensates for a delay between a torque command to the disconnect clutch and a measured torque of the disconnect clutch, and
adjust the model based on a difference between an expected hydraulic pressure of the disconnect clutch and a measured hydraulic pressure of the disconnect clutch during the engine start.

2. The vehicle of claim 1, wherein the difference between the expected hydraulic pressure and the measured hydraulic pressure is determined at a kiss point of the disconnect clutch but prior to commanding clutch engagement.

3. The vehicle of claim 2, wherein the kiss point corresponds to an engagement point between opposing sides of the disconnect clutch but prior to transferring torque through the disconnect clutch.

4. The vehicle of claim 1, wherein the difference between the expected hydraulic pressure and the measured hydraulic pressure is determined after a boost phase of the disconnect clutch but prior to transferring torque through the disconnect clutch.

5. The vehicle of claim 1, wherein the model further compensates for a delay between a torque commanded to the electric machine and a measured torque of the electric machine.

6. The vehicle of claim 1, wherein adjustment to the model is based on a weighted and scaled value of the difference between the expected hydraulic pressure and the measured hydraulic pressure.

7. The vehicle of claim 1, wherein the controller is further programmed to, in response to the adjustment to the model during the engine start, control the torque of the disconnect clutch during a remainder of the engine start via changing the pressure applied to the disconnect clutch based on the model after being adjusted based on the difference.

8. A vehicle comprising:
an engine and an electric machine each configured to generate power to propel the vehicle;
a clutch disposed between the engine and the electric machine; and
a controller programmed to, in response to an engine start,
close the clutch to transfer power from the electric machine to the engine during the engine start,
control a torque of the clutch during the engine start via increasing a hydraulic pressure applied to the clutch based on a model that compensates for a delay between a command to increase a torque of the clutch and an actual torque of the clutch, and
adjust the model based on a difference between an expected hydraulic pressure of the clutch and a measured hydraulic pressure of the clutch during the engine start.

9. The vehicle of claim 8, wherein the difference between the expected hydraulic pressure and the measured hydraulic pressure is determined at a kiss point of the clutch but prior to commanding clutch engagement.

10. The vehicle of claim 8, wherein the difference between the expected hydraulic pressure and the measured hydraulic pressure is determined after a boost phase of the clutch but prior to transferring torque through the clutch.

11. The vehicle of claim 8, wherein the model further compensates for a delay between a torque commanded to the electric machine and a measured torque of the electric machine.

12. The vehicle of claim 8, wherein adjustment to the model is based on a weighted and scaled value of the difference between the expected hydraulic pressure and the measured hydraulic pressure.

13. The vehicle of claim 8, wherein the controller is further programmed to, in response to the adjustment to the model during the engine start, control the torque of the clutch during a remainder of the engine start via changing the pressure applied to the clutch based on the model after being adjusted based on the difference.

14. A vehicle comprising:
an engine configured to generate power;
an electric machine configured to generate power;
a disconnect clutch disposed between the engine and the electric machine; and
a controller programmed to, in response to a command to start the engine,
close the disconnect clutch to transfer power from the electric machine to the engine,
control a torque of the disconnect clutch via increasing a pressure applied to the disconnect clutch based on a first-order model of the pressure applied to the disconnect clutch, and
adjust the model based on a difference between an expected pressure of the disconnect clutch and a measured pressure of the disconnect clutch during a time period prior to transferring torque through the disconnect clutch.

15. The vehicle of claim 14, wherein the difference between the expected pressure and the measured pressure is determined at a kiss point of the disconnect clutch but prior to commanding clutch engagement.

16. The vehicle of claim 14, wherein the difference between the expected pressure and the measured pressure is determined after a boost phase of the disconnect clutch but prior to transferring torque through the disconnect clutch.

17. The vehicle of claim 14, wherein the model compensates for a delay between a torque command to the disconnect clutch and a measured torque of the disconnect clutch.

18. The vehicle of claim 14, wherein the model compensates for a delay between a torque commanded to the electric machine and a measured torque of the electric machine.

19. The vehicle of claim 14, wherein adjustment to the model is based on a weighted and scaled value of the difference between the expected pressure and the measured pressure.

20. The vehicle of claim 14, wherein the controller is further programmed to, in response to the adjustment to the model during the engine start, control the torque of the disconnect clutch during a remainder of the engine start via changing the pressure applied to the disconnect clutch based on the model after being adjusted based on the difference.

* * * * *